(12) United States Patent
Kaltenbach

(10) Patent No.: US 8,235,867 B2
(45) Date of Patent: Aug. 7, 2012

(54) METHOD FOR TREATMENT OF A DRIVELINE

(75) Inventor: Johannes Kaltenbach, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 411 days.

(21) Appl. No.: 12/699,174

(22) Filed: Feb. 3, 2010

(65) Prior Publication Data
US 2010/0227733 A1 Sep. 9, 2010

(30) Foreign Application Priority Data
Mar. 3, 2009 (DE) .......................... 10 2009 001 291

(51) Int. Cl.
*F16H 61/20* (2006.01)
(52) U.S. Cl. .......................................... 477/114; 477/3
(58) Field of Classification Search .................. 477/3, 5, 477/8, 11, 20, 21, 93, 112, 114, 190; 903/944, 903/946, 930; 180/65.25, 65.285, 65.29
See application file for complete search history.

(56) References Cited

U.S. PATENT DOCUMENTS

| | | | |
|---|---|---|---|
| 5,700,227 A | 12/1997 | Kosik et al. | |
| 5,905,349 A * | 5/1999 | Farkas et al. | 318/432 |
| 2006/0258506 A1* | 11/2006 | Ibamoto et al. | 477/5 |
| 2009/0093336 A1* | 4/2009 | Soliman et al. | 477/5 |

FOREIGN PATENT DOCUMENTS

| | | |
|---|---|---|
| DE | 195 30 612 A1 | 2/1997 |
| DE | 10 2006 003 714 A1 | 8/2001 |
| DE | 102 21 835 A1 | 12/2003 |
| DE | 10 2007 026 264 A1 | 12/2008 |
| WO | 2007/085367 A1 | 8/2007 |

* cited by examiner

Primary Examiner — Justin Holmes
(74) Attorney, Agent, or Firm — Davis & Bujold, P.L.L.C.

(57) ABSTRACT

A method of operating a drivetrain of a motor vehicle. The drivetrain comprising a drive aggregate with at least one electric machine. During operation of the drivetrain according to the method, when an accelerator pedal and a brake pedal are not actuated, the drivetrain is operated in a speed-regulated crawling mode and during this mode a nominal speed value is compared with an actual speed value and, on the basis of the difference between these speed values, a crawling torque is produced as a control output. During a purely electrical speed-regulated crawling operation, if a positive crawling torque is produced as the control output, then the torque produced by the electric machine is regulated such that the actual speed value is approximately equal to the nominal speed value and, during such operation, an electrical energy accumulator of the drivetrain is discharged more intensively since the electric machine is operated as a motor.

10 Claims, 2 Drawing Sheets

METHOD FOR TREATMENT OF A DRIVELINE

This application claims priority from German patent application serial no. 10 2009 001 291.5 filed Mar. 3, 2009.

FIELD OF THE INVENTION

The invention concerns a method for operating a drivetrain of a motor vehicle.

BACKGROUND OF THE INVENTION

The main components of a drivetrain are a drive aggregate and a transmission. The transmission converts rotation speeds and torques so as to deliver traction force supplied by the drive aggregate to a drive output of the drivetrain. The present invention concerns a method for operating a drivetrain comprising a drive aggregate which includes at least one electric machine, and preferably a transmission connected between the drive aggregate and a drive output. The transmission is preferably in the form of an automatic or automated manual transmission. In a purely electric vehicle the transmission can if necessary be omitted.

It is already known from the prior art to operate the drivetrain of a motor vehicle in a crawling mode when a gear is engaged in an automatic or automated transmission of the drivetrain and an accelerator pedal and a brake pedal of the drivetrain are not actuated, such that in this crawling mode a crawling torque is delivered which enables the motor vehicle, operated in the crawling mode, to roll at a low speed.

From DE 10 2006 003 714 A1 a speed-regulated crawling operation mode of a drivetrain of a motor vehicle is known. During the speed-regulated crawling operation, a nominal speed value is compared with an actual speed value and on the basis of the difference between the nominal and the actual speed values a crawling torque is produced as a control output.

The method known from DE 10 2006 003 714 A1 can be used with a drivetrain in which a planetary gear set is connected between the drive aggregate, which comprises an internal combustion engine and an electric machine, and the transmission.

This method is not suitable for use with a drivetrain in which no such planetary or overlap gear system is connected between the drive aggregate and the transmission. In particular, it is unsuitable for any type of parallel hybrid drivetrain in which a torque supplied by an electric machine to the drive output is added without an overlap gear system to the torque supplied to the drive output by the internal combustion engine, and for drivetrains with purely electric drive.

SUMMARY OF THE INVENTION

Starting from there, the present invention addresses the problem of providing a new type of method for operating a drivetrain of a motor vehicle.

When a positive crawling torque is required as the control output during purely electric, speed-regulated crawling operation, torque supplied by the electric machine of the drive aggregate is regulated in such manner that the speed value approximates the nominal speed value, and during this, since the electric machine is being operated as a motor, an electrical energy accumulator of the drivetrain is discharged more intensively. When a negative crawling torque is required as the control output during purely electric, speed-regulated crawling operation, torque supplied by the electric machine is regulated so that the speed value approximates the nominal speed value and during this, since the electric machine is being operated as a generator, an electrical energy accumulator of the drivetrain is charged more intensively.

With the help of the method according to the invention, speed-regulated crawling operation can be achieved with a drivetrain in which no planetary or overlap gear system is connected between the drive aggregate and the transmission.

In an advantageous further development of the invention, when the drive aggregate is in the form of a hybrid drive comprising an internal combustion engine in addition to the electric machine, it is checked whether, during speed-regulated crawling operation, the crawling torque, produced as a control output, can be supplied exclusively by the electric machine and, when the crawling torque is negative, if necessary also with assistance from a brake system, and when the check shows that this is the case, the internal combustion engine is decoupled from the drive output by completely disengaging a clutch connected between the internal combustion engine and the drive output. This results in purely electric-powered speed-regulated crawling. On the other hand, if it is found not to be the case, the crawling torque produced as the control output, is divided between the electric machine and the internal combustion engine in such manner that as much as possible of the crawling torque is provided by the electric machine and the internal combustion engine supplies the remainder of the crawling torque by slipping operation of the clutch between the internal combustion engine and the drive output.

BRIEF DESCRIPTION OF THE DRAWINGS

Preferred further developments of the invention emerge from the subordinate claims and from the description that follows. An example embodiment of the invention, to which it is not limited, is explained in more detail with reference to the drawings, which show:

DETAILED DESCRIPTION OF THE PREFERRED EMBODIMENTS

The present invention concerns a method for operating a drivetrain of a motor vehicle, and FIGS. 1 to 4 show respective examples of parallel hybrid drivetrains with which the method according to the invention is preferably used.

Figure 1:
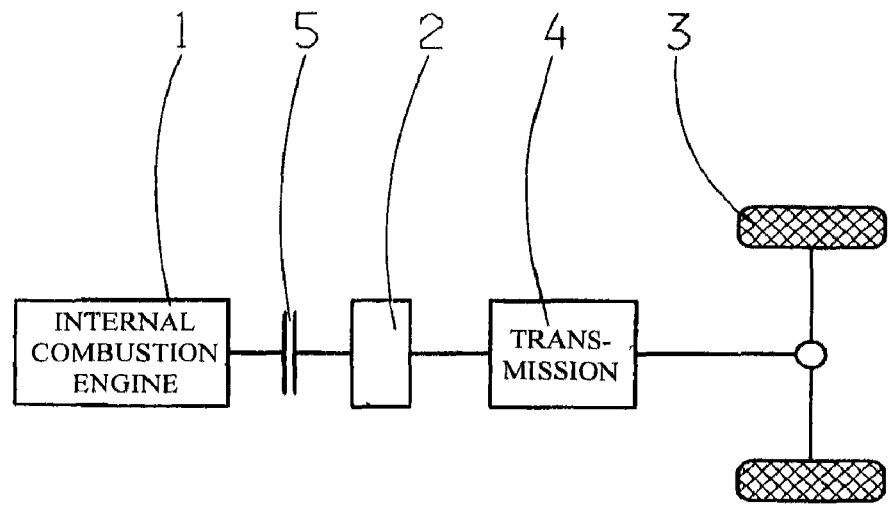
FIG. 1: A first drivetrain layout for a motor vehicle, with which the method according to the invention can be used

FIG. 1 shows a very schematically represented drivetrain layout of a first parallel hybrid drivetrain, the drivetrain of FIG. 1 comprises a drive aggregate with an internal combustion engine 1 and an electric machine 2. Between the drive aggregate, to be precise between its electric machine 2 and a drive output 3, is connected an automatic or automated transmission 4, the transmission 4 preferably being an automatic or automated manual transmission. As shown in FIG. 1, a clutch 5 is connected between the internal combustion engine 1 and the electric machine 2 of the drivetrain, the clutch being completely disengaged when the internal combustion engine 1 is decoupled from the drive output 3.

Figure 2:
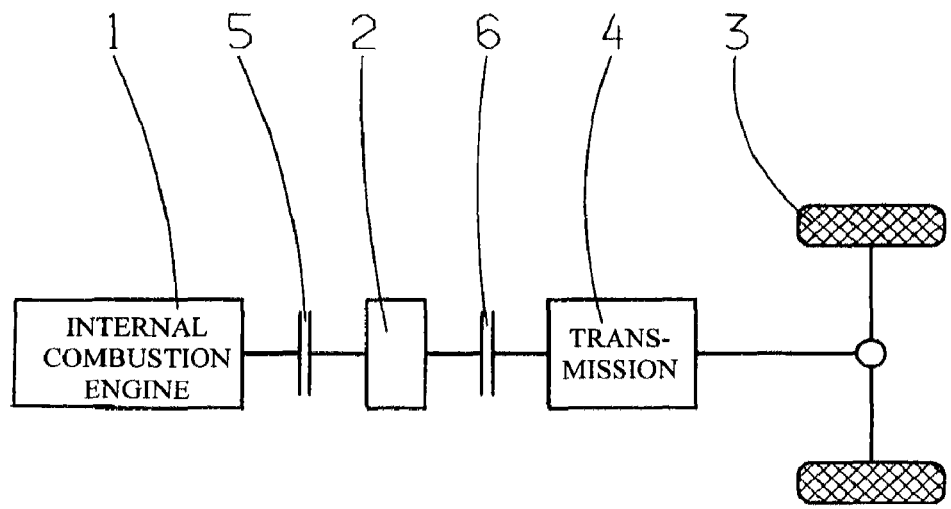
FIG. 2: A second drivetrain layout for a motor vehicle, with which the method according to the invention can be used

FIG. 2 shows a very schematically represented drivetrain layout of a second parallel hybrid drivetrain, the drivetrain of FIG. 2 comprising, in addition, a clutch 6 connected between the electric machine 2 and the transmission 4. The clutch 6 between the electric machine 2 and the transmission 4 constitutes a starting element external to the transmission. Instead of such a transmission-external starting element, the drivetrain of FIG. 1 preferably comprises a transmission-internal starting element (not shown).

Figure 3:
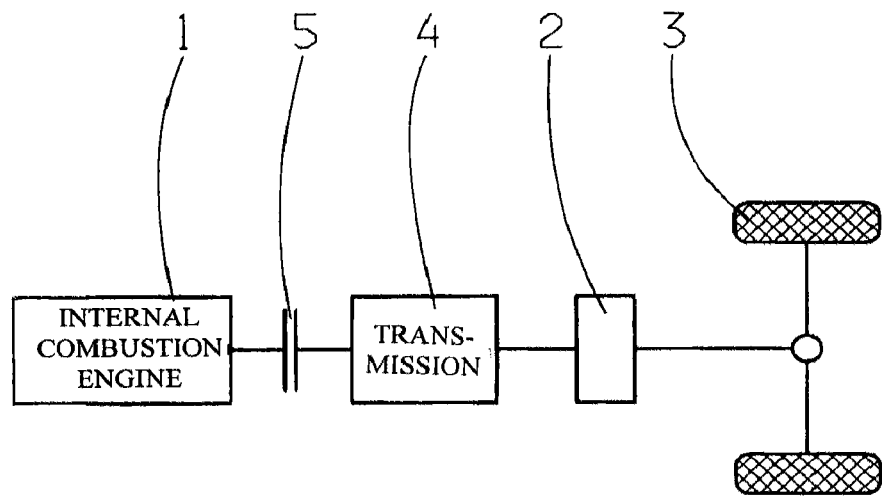
FIG. 3: A third drivetrain layout for a motor vehicle, with which the method according to the invention can be used

FIG. 3 shows very schematically a drivetrain layout of a third parallel hybrid drivetrain, the electric machine 2 in the drivetrain of FIG. 3 being connected between the transmission 4 and the drive output 3. Thus, the parallel hybrid drivetrain of FIG. 3 has a drive aggregate with its electric machine 2 on the drive output side.

Figure 4:
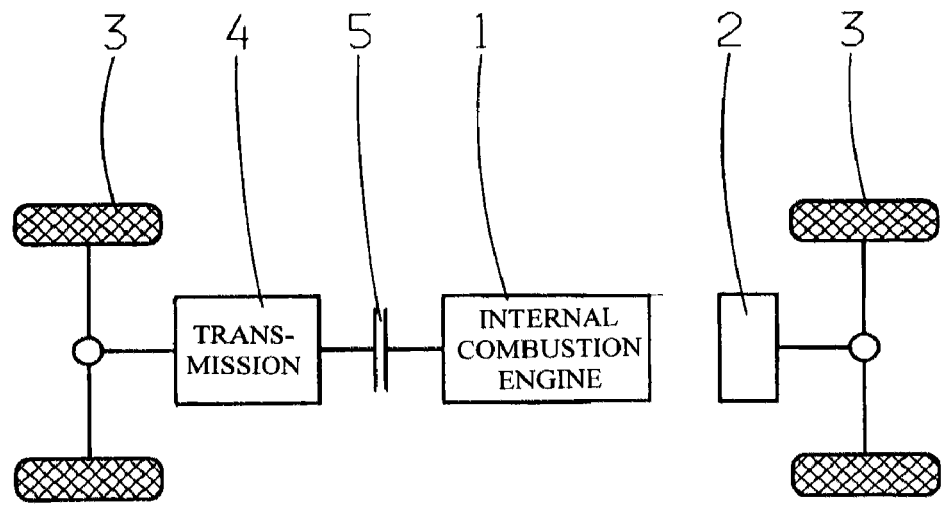
FIG. 4: A further drivetrain layout for a motor vehicle, with which the method according to the invention can be used

In the fourth parallel hybrid drivetrain shown in FIG. 4 the drive output 3 has two driven axles, a first axle of the output 3 being driven by the internal combustion engine 1 via the transmission 4 and a second axle of the output 3 being driven by the electric machine 2.

The common feature of the drivetrains shown in FIGS. 1 to 4 is that torque provided by the electric machine 2 is added without any overlap gearing to the torque supplied by the internal combustion engine 1.

With the help of the method according to the invention for operating a drivetrain, particularly with the parallel hybrid drivetrains shown in FIGS. 1 to 4, speed-regulated crawling operation can be achieved such that during this speed-regulated crawling operation a nominal speed value of the drivetrain is compared with an actual speed value thereof and, on the basis of the difference between the nominal and actual speed values, a crawling torque is produced as the control output with the help of a regulator, on whose basis crawling operation takes place so that regardless of the driving resistance, the motor vehicle rolls at the specified nominal speed.

In the parallel hybrid drivetrains shown in FIGS. 1 to 4, which have as their drive aggregate a hybrid drive with an internal combustion engine 1 and an electric machine 2, in the context of the invention it is checked whether, during the speed-regulated crawling operation, the crawling torque called for by the regulator as the control output can be provided exclusively by the electric machine and, in the case of a negative crawling torque, if necessary also with assistance from a brake unit of the drivetrain, and if it is found that the crawling torque can be provided by the electric machine alone, if necessary with assistance from the brake unit, then the internal combustion engine 1 is decoupled from the drive output 3 by disengaging the clutch 5 connected between the internal combustion engine 1 and the drive output 3.

In this case, i.e. when the internal combustion engine 1 is decoupled from the drive output 3, purely electric speed-regulated crawling operation takes place, and for this the internal combustion engine 1 can be switched of if needs be.

During purely electric speed-regulated crawling operation, when a positive crawling torque is produced or is called for by the regulator as the control output, a torque supplied by the electric machine 2 is regulated so that the actual speed value of the motor vehicle approximates its nominal speed value, i.e. so that the desired movement speed of the motor vehicle is obtained, and during this an electrical energy accumulator of the drivetrain is discharged more intensively since the electric machine 2 is being operated as a motor.

In contrast, when during purely electric speed-regulated crawling operation a negative crawling torque is called for by the regulator as the control output, the torque supplied by the electric machine 2 is again regulated so that the speed approximates the nominal speed value, but in this case an electrical energy accumulator of the drivetrain is charged more intensively since the electric machine 2 is being operated as a generator.

If the negative crawling torque required during purely electric speed-regulated crawling operation cannot be provided exclusively by operating the electric machine 2 as a generator, then in addition a brake unit of the drivetrain (not shown in FIGS. 1 to 4) can supply a braking torque at the drive output 3 so that the nominal speed specified for the speed-regulated crawling operation is maintained.

If it is found that during speed-regulated crawling operation the crawling torque produced or called for as the control output cannot be produced exclusively by the electric machine, if necessary also with assistance from the brake unit, then the crawling torque to be produced is shared between the electric machine 2 and the internal combustion engine 1, namely in such manner that the electric machine 2 provides as much as possible of the crawling torque and, by slipping operation of the clutch 5 connected between the internal combustion engine 1 and the drive output 3, the internal combustion engine 1 provides the remainder of the crawling torque. Since the torque provided by the electric machine 2 can be transmitted to the drive output 3 without wear and since in relation to this torque there is less power loss, as much of the crawling torque to be produced is supplied by the electric machine 2 and only the rest of it is provided to the drive output 3 by the internal combustion engine 1 via the clutch 5 operating in a slipping mode.

In this division between the electric machine 2 and the internal combustion engine 1 of the crawling torque to be produced, if a positive crawling torque is required as the control output the internal combustion engine 1 is operated in the idling mode and since the speed of an idling internal combustion engine 1 is higher than the speed of the slipping clutch 5 on the drive output side, the clutch 5 can transmit a positive torque.

An idling regulator of the internal combustion engine 1 can compensate for the load transmitted by the clutch 5.

In the division of the crawling torque between the electric machine 2 and the internal combustion engine 1, if a negative torque is required as the control output the engine-braking action of the internal combustion engine 1 can be used by switching off or stopping the internal combustion engine 1, and in that case no fuel is any longer fed to the internal combustion engine 1.

When the internal combustion engine is stopped, the slipping clutch 5 can apply or transmit a negative torque, since the speed of the internal combustion engine 1 is then either zero or, after overcoming the static friction, it is lower than the speed of the clutch 5 on the drive output side.

Even if the internal combustion engine 1 is dragged up by the torque transmitted by the clutch 5 and the clutch 'catches', the friction torque of the internal combustion engine 1 can be used to supply the necessary negative crawling torque.

If the negative crawling torque provided by the electric machine 2 and the internal combustion engine 1 together is still not sufficient, then in addition the torque shortfall can be provided by a brake unit of the drivetrain as a braking torque at the drive output, so that the necessary control torque is shared between the electric machine 2, the internal combustion engine 1 and the brake unit.

The method according to the invention has been described with reference to FIGS. 1 to 4 for parallel hybrid drivetrains.

It should be pointed out, however, that the method according to the invention can also be used when the drivetrain comprises an electric machine exclusively, so that purely electrically powered speed-regulated crawling operation can take place. As regards such purely electric speed-regulated crawling operation, reference can still be made to the above explanations. In a purely electric vehicle, the transmission can be omitted if necessary.

In a drivetrain with hybrid drive, as much as possible of the required crawling torque is provided or applied by the electric machine 2.

If the electric machine 2 alone cannot apply or provide the necessary crawling torque, the nominal speed can still be maintained since in that case additional torque can be provided at the drive output by the internal combustion engine 1 or the clutch 5, and this, both for traction operation with a positive crawling torque and for thrust operation with a negative crawling torque of the drivetrain.

During thrust operation, a brake unit or service brake of the drivetrain can if necessary also be used to provide additional, assisting torque at the drive output 3 so that the nominal speed value of the speed-regulated crawling operation is maintained.

INDEXES

1 Internal combustion engine
2 Electric machine
3 Drive output
4 Transmission
5 Clutch
6 Clutch

The invention claimed is:

1. A method of operating a drivetrain of a motor vehicle in which the drivetrain comprises a drive aggregate with at least one electric machine such that a nominal speed value is compared with an actual speed value and, on a basis of a difference between the nominal and the actual speed values, a crawling torque is produced as a control output, the method comprising the steps of:
   operating the drivetrain in a speed-regulated crawling mode when an accelerator pedal and brake pedal are not actuated;
   regulating torque produced by the electric machine of the drivetrain, during a purely electrical speed-regulated crawling operation, such that the actual speed value approximates the nominal speed value, when a positive crawling torque is required as the control output; and
   discharging an electrical energy accumulator of the drivetrain by operation of the electric machine as a motor.

2. The method according to claim 1, further comprising the step of regulating the torque produced by the electric machine of the drivetrain, during a purely electrical speed-regulated crawling operation, such that the actual speed value approximates the nominal speed value, and charging the electrical energy accumulator of the drivetrain by operation of the electric machine as a generator, when a negative crawling torque is required as the control output.

3. The method according to claim 2, further comprising the step of providing an additional braking torque at the drive output with a brake unit of the drivetrain, when the negative crawling torque cannot be provided exclusively by the electric machine.

4. The method according to claim 1, further comprising the step of forming the drive aggregate as a hybrid with an internal combustion engine, and checking, during the speed-regulated crawling operation, whether the crawling torque required as the control output is negative and can be provided exclusively by the electric machine and, if necessary, with assistance from a brake unit, and decoupling the internal combustion engine from the drive output by completely disengaging a clutch connected between the internal combustion engine and the drive output, when the crawling torque is negative.

5. The method according to claim 4, further comprising the step of, when the crawling torque is negative, decoupling the internal combustion engine from the drive output and switching off the internal combustion engine.

6. The method according to claim 4, further comprising the step of, when the crawling torque is positive, sharing the crawling torque, required as a control output, between the internal combustion engine and the electric machine in such a manner that the electric machine provides as much of the torque as possible, and the internal combustion engine provides a remainder of the torque by operating the clutch between the internal combustion engine and the drive output in a slipping mode.

7. The method according to claim 6, further comprising the step of, when the crawling torque required as the control output is positive, operating the internal combustion engine in an idling mode.

8. The method according to claim 6, further comprising the step of when the crawling torque required as the control output is negative, switching off the internal combustion engine.

9. The method according to claim 8, further comprising the step of providing braking torque at the drive output with a brake unit of the drivetrain, when the negative crawling torque cannot be provided exclusively by the electric machine and the internal combustion engine.

10. A method of operating a drivetrain of a motor vehicle, the drivetrain comprising a drive aggregate with at least one electric machine, the method comprising the steps of:
    operating the drivetrain in a speed-regulated crawling mode when an accelerator pedal and a brake pedal are not actuated;
    comparing a nominal speed value of a drive output with an actual speed value of the drive output;
    producing an offsetting torque with the electric machine of the drivetrain based on a difference between the nominal speed value and the actual speed value of the drive output;
    reducing the difference between the nominal speed value and the actual speed value of the drive output by applying the offsetting torque to the drive output such that the actual speed value is approximately the same as the nominal speed value of the drive output; and
    applying a positive offsetting torque, with the electric machine, to the drive output, during a purely electrical speed-regulated crawling operation, by operating the electric machine as a motor with an intensive discharge of electrical energy from an electrical energy accumulator.

* * * * *